US006691956B1

(12) United States Patent
Waterman

(10) Patent No.: US 6,691,956 B1
(45) Date of Patent: Feb. 17, 2004

(54) AIRPLANE SECURITY SYSTEM

(76) Inventor: Serville A. Waterman, 899 E. 46th St., Brooklyn, NY (US) 11203

( * ) Notice: Subject to any disclaimer, the term of this patent is extended or adjusted under 35 U.S.C. 154(b) by 0 days.

(21) Appl. No.: 10/189,273

(22) Filed: Jul. 3, 2002

(51) Int. Cl.[7] .............................................. B64C 13/00
(52) U.S. Cl. ....................................... 244/189; 244/196
(58) Field of Search ............................... 244/3.11, 3.14, 244/189, 196, 197

(56) References Cited

U.S. PATENT DOCUMENTS

| | | | | |
|---|---|---|---|---|
| 2,620,148 A | * | 12/1952 | Baring-Gould et al. | 244/189 |
| 2,762,992 A | * | 9/1956 | Schmid | 340/990 |
| 3,082,978 A | * | 3/1963 | Smith et al. | 244/197 |
| 5,067,674 A | * | 11/1991 | Heyche et al. | 244/190 |
| 2002/0035415 A1 | * | 3/2002 | Gardner | 701/3 |

* cited by examiner

*Primary Examiner*—Robert P. Swiatek
(74) *Attorney, Agent, or Firm*—Edwin D. Schindler

(57) ABSTRACT

An airplane security system, particularly for a commercial airliner, includes an on-board device for allowing a person not on-board the airplane to override an on-board piloting system for the airplane. This on-board device is used together with an off-board device for allowing the person not on-board the airplane to contact the on-board device for overriding the on-board piloting system. The person off-board the airplane can then utilize a device for directing a flight path for the airplane that would differ from the flight path originally intended by those on-board and piloting the airplane, including providing for the safe landing of the airplane.

12 Claims, 1 Drawing Sheet

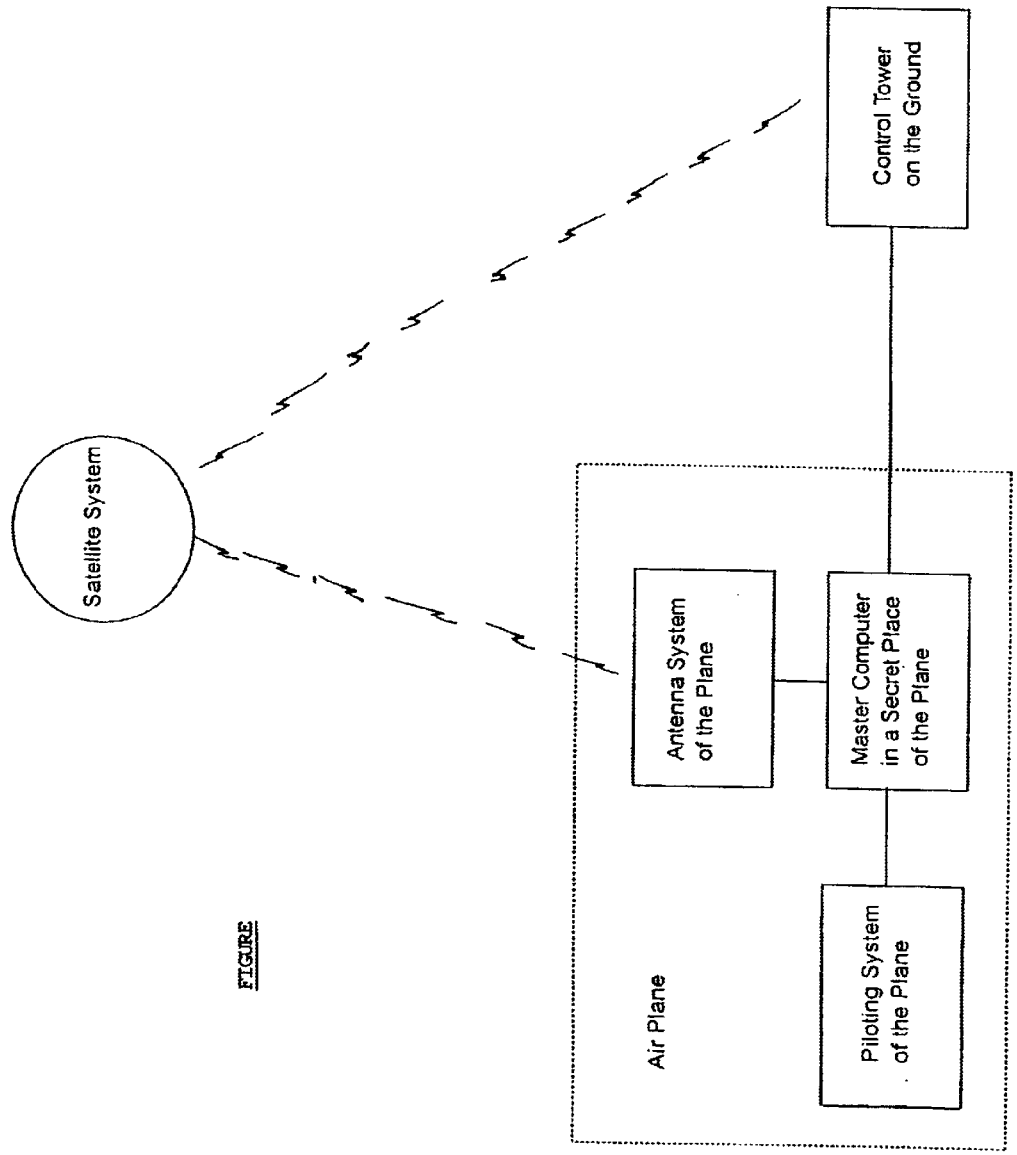
FIGURE

AIRPLANE SECURITY SYSTEM

BACKGROUND OF THE INVENTION

1. Technical Field of the Invention

The present invention relates, generally, to a commercial airplane security system.

More particularly, the present invention relates to a commercial airplane security system which permits air traffic controllers located on the ground to take control of a commercial airline which has been hijacked by disabling an air-plane's manual control system and initiating control via auto-pilot or, if so needed, to allow authorized airline pilots located in the control tower on the ground to assume manual control of the hijacked airliner.

2. Description of the Prior Art

The notion that a hijacked commercial airliner might be used as a guided missile by hijackers having no concern for their own lives, rather than simply lacking any concern for the lives of others on the hijacked plane, was probably not seriously contemplated prior to Sep. 11, 2001. The events of that date have starkly established that the use of a hijacked airliner as a weapon, rather than being used in a more "conventional" hostage-taking scenario in which demands are made and negotiations of some sort follow, can realistically occur.

In "classic" hijacking situations, such as the spate of hijackings of U.S. airliners to Cuba in the 1960's and '70's, the hijacker, ironically, had a shared desire with the passengers for the safe travel of the plane to a location not on the original flight plan. In such circumstances, priority was generally given by various governments, air traffic controllers and airline personnel to first assuring a safe landing of the hijacked plane anywhere as an initial step in enhancing the eventual safety of all passengers on board the hijacked airliner.

As a consequence, there was a perverse, but shared, interest on the parts of governmental official and the airlines, along with the hijackers of commercial airlines, to allow those piloting the hijacked airplanes to veer off course, as may be necessary, to safely land the hijacked plane as quickly as possible, wherever possible.

Conversely, where the intent of hijackers is to use a hijacked airliner as a weapon, as was the situation on Sep. 11, 2001, in New York and Washington, D.C., governmental officials simply do not have the luxury of allowing the hijacked plane to be piloted to wherever the hijackers may desire to go.

Accordingly, the events of recent history have made clear that governmental officials, including air traffic controllers, and the airlines themselves, should have some means for taking over control of the flight path of a hijacked commercial airliner as a possible way of preventing the hijacked airplane to be use as a missile, and stopping short of deciding whether such a hijacked plane must be shot-down by the Air Force as being the most desirable option from an array of extremely undesirable alternatives.

SUMMARY OF THE INVENTION

Accordingly, it is an object of the present invention to provide a commercial airline security system, which would allow governmental officials, including air traffic controllers, to take control of the flight path of a hijacked commercial airliner, where it is reasonably believed that the intent of those who have hijacked the airliner is to employ the hijacked plane as a weapon, rather than seeking a safe landing of the hijacked plane.

It is a further object of the present invention to provide a commercial airline security system, which would allow governmental officials, etc., to override an airplane's manual control system and to, instead, place a hijacked airliner on an auto-pilot system, which auto-pilot system cannot itself be overridden by those on board the hijacked plane.

It is, yet, a further object of the present invention to provide a commercial airline security system, which would allow authorized airline pilots, located on the ground, to guide the flight path of the hijacked airliner.

The foregoing and related objects are achieved by the present invention for a commercial airline security system, which would include computerized means on board a hijacked airliner, which is capable of being activated by, e.g., an air traffic controller or even the pilot of another plane, which, when activated, would initiate the auto-pilot system of the hijacked airliner or, as an alternative, permit those on the ground, or in other airliners, to manually control the flight path of the hijacked plane.

It is preferable that the computerized means on board the hijacked airliner, which would permit those off the plane to override the flight controls available to those on the hijacked plane, be situated in a location not readily available to those on board the hijacked plane, such as the under-belly of the hijacked plane. In a particularly preferred embodiment, the computerized means for allowing the on-board flight controls to be overridden would be situated at various locations on board the commercial airliner and that such plurality of locations be redundant of one another, such that the discovery, or tampering, of one means for allowing on-board flight controls to be overridden would trigger similar means located elsewhere on board the hijacked plane to then take-over controlling the hijacked flight. In such circumstances, it would be preferable for any such computerized means that are tampered with to be rendered useless and, instead, have such tampered means defer to various other hidden controls on board that would have not been corrupted.

The Global Positioning System ("GPS"), first developed under contract by the United States Government, and since made available to the general public, and which now assists persons who may be lost on the nation's highways, as well as providing the date and time on every cellular telephone in the country, could be utilized in guiding the automatic pilot of a hijacked airliner, or to assist an off-board pilot, to pilot the hijacked airplane to safety.

The commercial airliner so hijacked may also include, as may be necessary, means for allowing it to be laser-guided and to include the necessary radar sensors for allowing the hijacked plane to maneuver safely and to eventually land safely, preferably, at the nearest available airport.

The present invention has been discussed in connection with commercial airliners, however, there is no technological reason for why such a security system could not be included in a private jetliner and, consequently, the present invention shall be considered as encompassing the use of such a system on a private airplane, as well as a commercial airliner.

Further, while the initial motivation for devising the airline security system of the present invention was, admittedly, the event of Sep. 11, 2001, the security system of the present invention could, naturally, be readily activated in the event that those piloting an aircraft unexpectedly become ill or otherwise unable to continue flying the aircraft safely.

Other objects and features of the present invention will become apparent when considered in combination with the accompanying drawing figure which illustrates the general concept and a preferred embodiment of the present invention. It should, however, be noted that the accompanying drawing figure is intended to illustrate only a certain embodiment of the claimed invention and is not intended as a means for defining the limits and scope of the invention.

BRIEF DESCRIPTION OF THE DRAWING FIGURE

The single drawing FIGURE accompanying the instant textual Specification is a schematic representation of one preferred embodiment of the presently claimed invention, showing the relationship between air traffic controllers located on the ground, a satellite positioning/control system, and features of an airplane incorporating the security system of the invention.

DETAILED DESCRIPTION OF THE DRAWING FIGURES AND PREFERRED EMBODIMENTS

Turning now, in detail, to an analysis of the sole drawing FIGURE, which is a schematic diagram of a preferred embodiment of the airline security system of the present invention, and how it is intended to operate.

In the drawing FIGURE, the "Air Plane" is schematically shown as including both a manual piloting system, operable by those on board the aircraft, as well as computerized means for overriding the airplane's manual piloting system, which would permit those off-board, such as air traffic controllers on the ground, or authorized pilots in other airplanes, to operate the airplane on which the manual piloting system is overridden. Alternatively, the automatic piloting system of the distressed aircraft can be activated.

While only a single "master computer" located at a secret location on the airplane is shown in the schematic drawing, it would be preferable, in most instances, particularly for commercial airliners, that a plurality of computerized means for overriding the manual piloting system be located throughout the aircraft, and that the tampering of the system at one location, would disable the computerized means at the tampered location, in favor of a redundant, or back-up system at, yet, another location on the aircraft generally unknown to those on board. Further, while the location of various computerized means should be unknown to those on board, likewise, the precise number in any given airliner should also be varied and, thus, unknown from one airline to the next.

The schematic diagram of the accompanying drawing FIGURE also shows the use of a satellite system, such as the Global Positioning System ("GPS"), for allowing those located in the air traffic control tower to contact, locate and further direct the flight path of the hijacked, or otherwise distressed, airliner. The air traffic control tower would, preferably, activate the means for further directing the flight path of the intended aircraft by entering a secret code, e.g., a numeral code, specific to the particular aircraft hijacked and which, presumably, knowledge of such secret code would, in fact, remain secret.

While only several embodiments of the present invention have been shown and described, it will be obvious to those skilled in the art that many modifications may be made to the present invention without departing from the spirit and scope thereof.

What is claimed is:

1. An airplane security system, comprising:

an airplane having means on-board said airplane for allowing a person not on-board to override an on-board piloting system for said airplane comprising computerized means secretly located on board said airplane;

means off-board said airplane for allowing said person not on-board said airplane to contact said means on-board said airplane for overriding said on-board piloting system; and, means off-board said airplane for allowing said person not on-board said airplane to direct a flight path for said airplane that would differ from a flight path intended by one piloting said airplane on-board.

2. The airplane security system according to claim 1, wherein said computerized means is comprised of a plurality of computers located secretly on said airplane.

3. The airplane security system according to claim 2, wherein each of said plurality of computers located secretly on said airplane comprises means for overriding the on-board piloting system for said airplane and tamper-resistant means for deferring control of the on-board piloting system to another computer of said plurality of computers if a given computer is corrupted.

4. The airplane security system according to claim 1, wherein said means on-board said airplane for allowing a person not on-board to override an on-board piloting system for said airplane includes means for activating an automatic piloting system for said airplane.

5. The airplane security system according to claim 4, wherein said automatic piloting system for said airplane is located off-board said airplane.

6. The airplane security system according to claim 1, wherein said means on-board said airplane for allowing a person not on-board to override an on-board piloting system for said airplane includes means for activating an off-board manual piloting system for said airplane.

7. The airplane security system according to claim 6, wherein said off-board manual piloting system for said airplane is located at an on-ground air-traffic control tower.

8. The airplane security system according to claim 6, wherein said off-board manual piloting system for said airplane is located in an airborne facility.

9. The airplane security system according to claim 1, wherein said means off-board said airplane for allowing said person not on-board said airplane to contact said means on-board said airplane for overriding said on-board piloting system includes the Global Positioning System (GPS).

10. The airplane security system according to claim 1, wherein means off-board said airplane for allowing said person not on-board said airplane to direct a flight path for said airplane includes the Global Positioning System (GPS).

11. The airplane security system according to claim 1, wherein means off-board said airplane for allowing said person not on-board said airplane to direct a flight path for said airplane includes means for safely landing said airplane.

12. The airplane security system according to claim 1, wherein said means off-board said airplane for allowing said person not on-board said airplane to contact said means on-board said airplane for overriding said on-board piloting system includes means for using a secret code for allowing said person not on-board to override said on-board piloting system.

* * * * *